US009600500B1

(12) United States Patent
Gupta et al.

(10) Patent No.: US 9,600,500 B1
(45) Date of Patent: Mar. 21, 2017

(54) SINGLE PHASE TRANSACTION COMMITS FOR DISTRIBUTED DATABASE TRANSACTIONS

(71) Applicant: Amazon Technologies, Inc., Reno, NV (US)

(72) Inventors: Anurag Windlass Gupta, Atherton, CA (US); Jakub Kulesza, Bellevue, WA (US); Don Johnson, Seattle, WA (US); Deepak Agarwal, Redmond, WA (US); Tushar Jain, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 845 days.

(21) Appl. No.: 13/923,688

(22) Filed: Jun. 21, 2013

(51) Int. Cl.
*G06F 7/00* (2006.01)
*G06F 17/30* (2006.01)

(52) U.S. Cl.
CPC .. *G06F 17/30289* (2013.01); *G06F 17/30348* (2013.01); *G06F 17/30377* (2013.01)

(58) Field of Classification Search
CPC ............... G06F 17/30377; G06F 17/30348
See application file for complete search history.

(56) References Cited

U.S. PATENT DOCUMENTS

| 4,627,019 | A | * | 12/1986 | Ng | G06F 17/30356 707/695 |
| 5,247,672 | A | * | 9/1993 | Mohan | G06F 9/526 707/999.008 |
| 5,491,822 | A | | 2/1996 | Allen et al. | |
| 7,277,897 | B2 | | 10/2007 | Bamford et al. | |
| 7,337,129 | B1 | * | 2/2008 | Lowry | G06Q 30/00 705/2 |
| 7,730,489 | B1 | * | 6/2010 | Duvur | G06F 9/466 714/2 |
| 8,301,593 | B2 | | 10/2012 | Hoffmann et al. | |
| 8,356,007 | B2 | | 1/2013 | Larson et al. | |

(Continued)

OTHER PUBLICATIONS

Lee et al. "A Single Phase Distributed Commit Protocol for Main Memory Database Systems." Proceedings of the International Parallel and Distributed Processing Symposium (IPDPS '02). 2002. 8 pages.*

(Continued)

*Primary Examiner* — Charles Lu
(74) *Attorney, Agent, or Firm* — Robert C. Kowert; Meyertons, Hood, Kivlin, Kowert & Goetzel, P.C.

(57) ABSTRACT

A distributed database system may perform a single phase commit for transactions involving updates to multiple databases of the distributed database system. A client request may be received that involves updates to multiple database of the distributed database system. The updates may be performed at a front-end database and a back-end database. Log records indicating the updates to the front-end database may be sent to the back-end database. The log records and the updates performed at the back-end database may be committed together as a single phase commit at the back-end database. In the event of a system failure of the front-end database, log records may be requested and received from the back-end database. A restoration of the front-end database may be performed based, at least in part, on the received log records.

20 Claims, 7 Drawing Sheets

(56) References Cited

U.S. PATENT DOCUMENTS

| | | |
|---|---|---|
| 8,442,962 B2 | 5/2013 | Lee et al. |
| 8,463,761 B2 | 6/2013 | Pardon et al. |
| 8,626,709 B2 | 1/2014 | Isaacson et al. |
| 2005/0086246 A1* | 4/2005 | Wood ................ G06F 17/30289 |
| 2008/0250057 A1* | 10/2008 | Rothstein .......... G06F 17/30286 |

OTHER PUBLICATIONS

Inseon Lee, Heon Y. Yeom, "A Single Phase Distributed Commit Protocol for Main Memory Database Systems," IPDPS 2002: Proceedings of the 16th International Parallel and Distributed Processing Symposium, pp. 1-8.

* cited by examiner

SINGLE PHASE TRANSACTION COMMITS FOR DISTRIBUTED DATABASE TRANSACTIONS

BACKGROUND

As the technological capacity for organizations to create, track, and retain information continues to grow, a variety of different technologies for managing and storing the rising tide of information have been developed. Distributed database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. For many distributed database systems, managing and maintaining data across distributed resources also involves the reliability of storage systems. System transactions that are performed across multiple resources of distributed systems are one area where maintaining reliability can impede efficient performance. As a result, new technologies more and more seek to reduce both the complexity and storage requirements of maintaining data while simultaneously improving the efficiency of data storage and data management.

Figure 1:
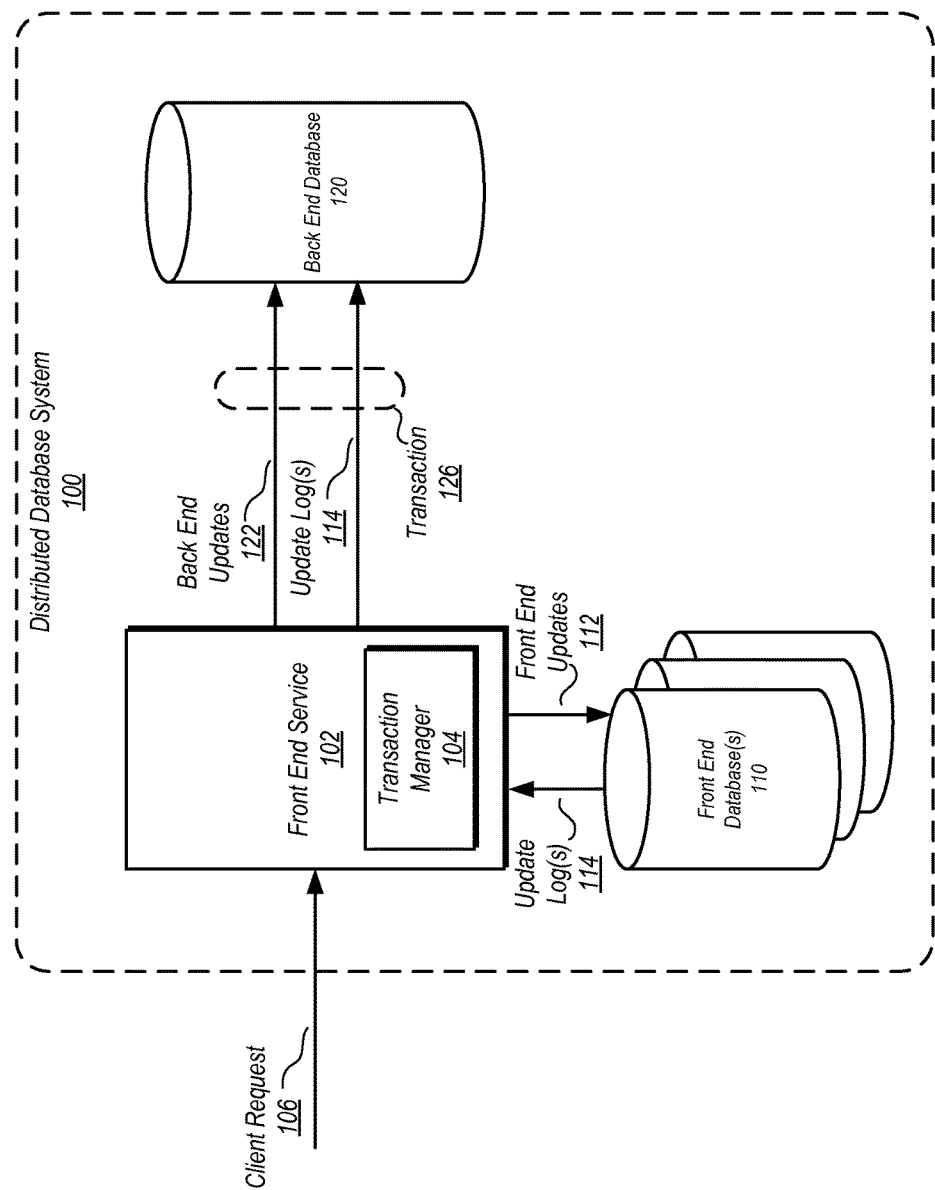
FIG. 1 is a block diagram illustrating single phase transaction commits for distributed database transactions, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Generally database systems adhere to ACID (Atomicity Consistency Isolation and Durability) properties in order to provide reliability when executing transactions. For distributed database systems, maintaining ACID properties is further complicated by the distributed nature of the individual systems, nodes, or devices implementing the distributed database system. For instance, if multiple nodes store the same replica of data, then changes made to the data may need to be made at each of the multiple nodes in order to make the changes for the replica of data durable. Without coordinating and ensuring that these changes are made to the nodes, incorrect data may be maintained.

Some distributed database systems implement a transaction coordinator to ensure that changes are received and applied across different nodes, or in the case where changes at one or more nodes are not applied, that the change is removed from the nodes in order to provide consistency. Multiple-phase commit protocols, such as the two-phase commit protocol, are typically implemented to provide transaction consistency across changes to multiple nodes (e.g. databases). In the two-phase commit protocol, for example, the transaction coordinator maintains the protocol state for each node involved in the transaction. Thus, if 5 nodes are involved in a transaction, then the state for these 5 nodes are maintained, requiring no small amount of overhead. Moreover, part of the multiple-phase aspect of such protocols is implemented by requiring agreement among the different nodes at different phases in order to ensure transactions are consistently committed among the multiple nodes. Continuing with the 5 node example, in a two-phase commit protocol, each node must first be queried to prepare to commit a transaction. Upon the agreement of the 5 nodes to commit the transaction, then a commit request is submitted to each of the 5 nodes which also must acknowledge the commit to the transaction coordinator. Failure of a commit in either phase results in the rollback (i.e. undo) of the transaction at each node. Such schemes are susceptible to various coordination errors if the transaction coordinator or one or more of the nodes fail at the wrong time. In order to restart a failed node, for instance, a view of the state of committed or un-committed transactions, such as in-flight transactions, at the other nodes must be known in order to maintain consistency of the transaction among the 5 nodes.

This specification begins with a general description of implementing single phase transaction commits for distributed database systems. Then, various examples of a distributed data warehouse service are discussed, including different components/modules, or arrangements of components/module, that may be employed as part of implementing a distributed data warehouse service configured to implement single phase transaction commits. A number of different methods and techniques to implement single phase transaction commits for a distributed database system are then discussed, some of which are illustrated in accompanying flowcharts. Finally, a description of an example computing system upon which the various components, modules, systems, devices, and/or nodes may be implemented is provided. Various examples are provided throughout the specification.

The systems described herein may, in some embodiments, implement various different methods and techniques for providing single phase transaction commits for distributed database transactions. Committed transactions may generally be described as transactions (changes, updates, etc. . . . ) that are consistently and durably preserved at a distributed database system, thus fulfilling ACID properties for the distributed database system. By implementing single phase transaction commits, in various embodiments, a distributed database system may reduce (or eliminate) the occurrence of various coordination errors and overhead for performing system transactions that are consistent among nodes, systems, or devices of a distributed database system. FIG. 1 is a block diagram generally illustrating single phase transaction commits for distributed database transactions, according to some embodiments.

Figure 2:
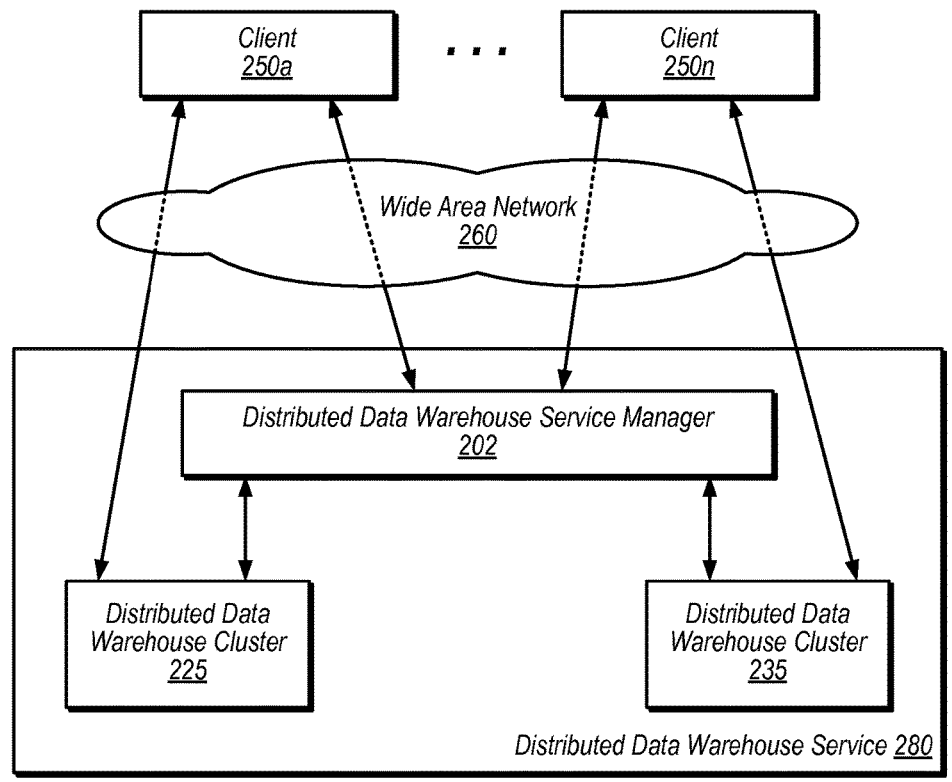
FIG. 2 is a block diagram illustrating various components of a distributed data warehouse service from the perspective of its clients, according to some embodiments.
Figure 3:
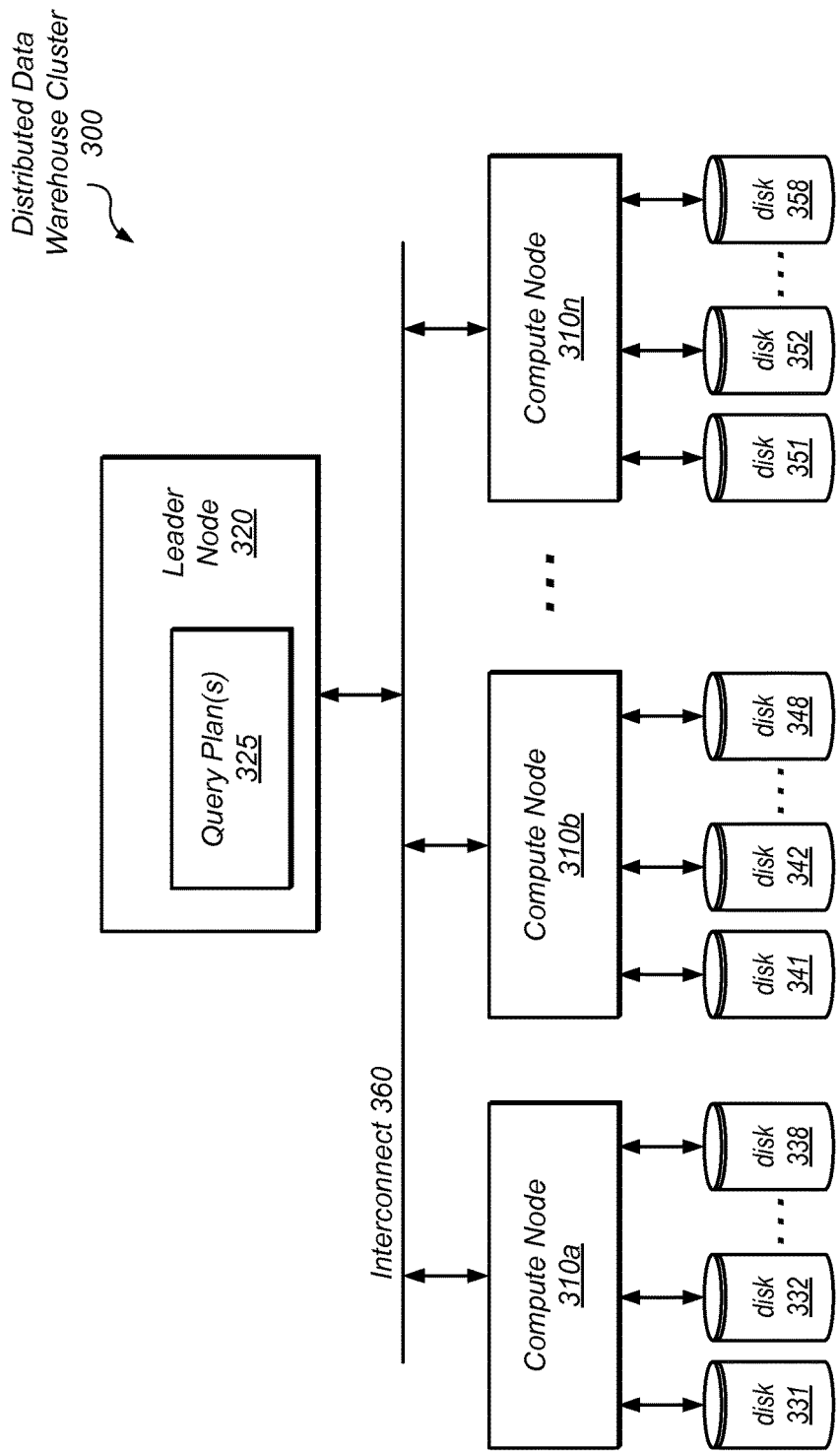
FIG. 3 is a block diagram illustrating various components of a distributed data warehouse system, according to some embodiments.
Figure 4:
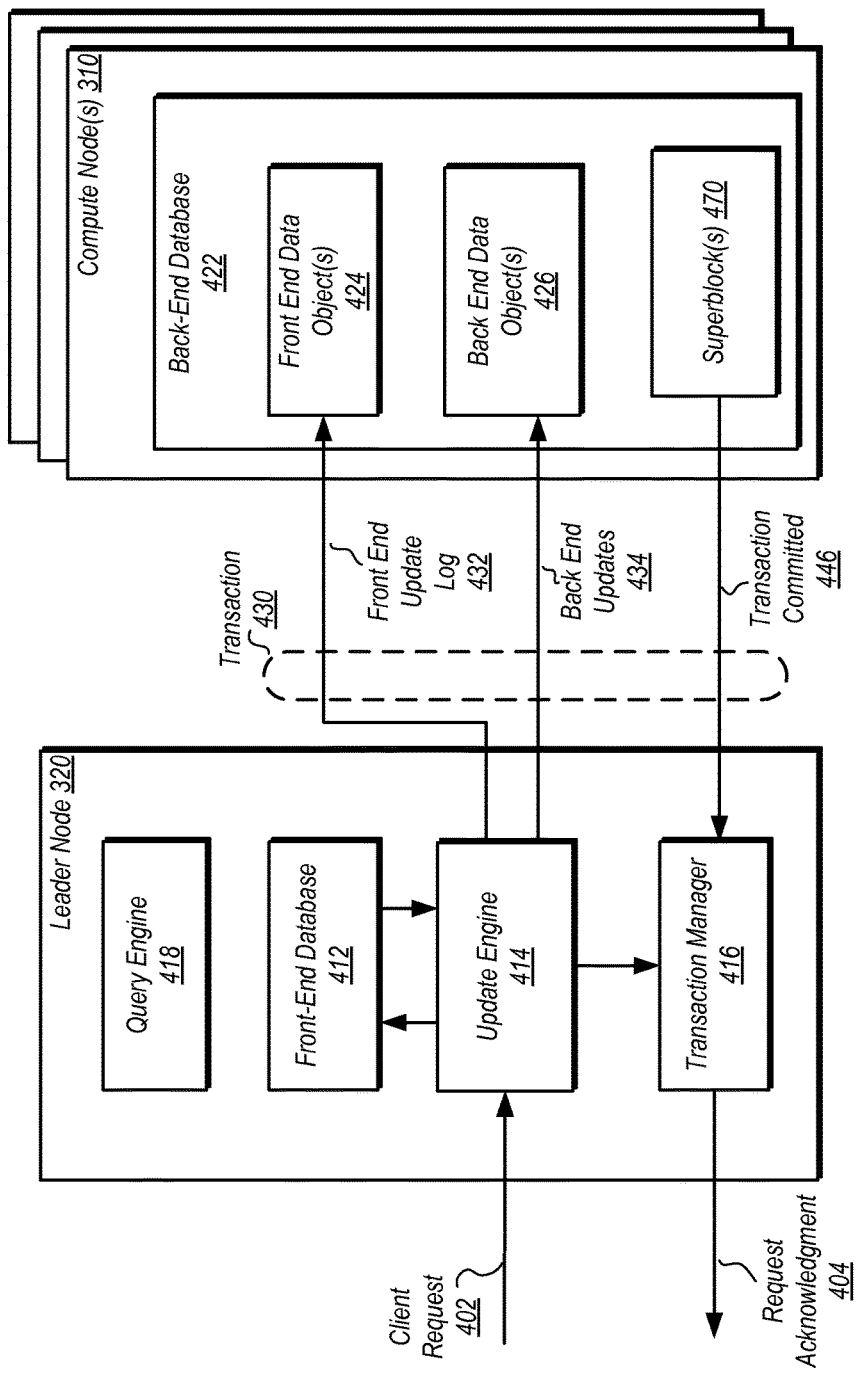
FIG. 4 is a block diagram illustrating single phase transaction commits among nodes implementing a distributed data warehouse system, according to some embodiments.

A distributed database system may generally be any distributed database system that implements one or more databases in a distributed manner. Various different configurations of hardware, such as various nodes, servers, desktop computers, or more generally any other form of computing device, and/or software, such as various virtual node instances or database management applications, may be used to implement a distributed database system. FIGS. 2-4, discussed in greater detail below, provide more specific examples of some configurations of a distributed database system. As illustrated in FIG. 1, distributed database system 100 implements two different database systems, front-end databases 110 and back-end database 120. Front-end databases 110 and back-end database 120 may be included in a variety of different distributed database system architectures and may, therefore, not be construed as limited in their roles by the terms "front-end" and "back-end." A front-end database, for example, may receive and apply updates after, or as a result of, updates applied to a back-end database. These databases may also be referred to by recovery methods. For instance, front-end database(s) 110 may implement write-ahead logging for recovery purposes. While back-end database 120 may implement versioning for recovery purposes. The relationship between front-end and back-end databases may also be defined by independence of the data maintained between the databases. For example, in some embodiments, the front-end database(s) 110 may be dependent on the version of data maintained at the back-end database 120, which may be definitive or authoritative for the front-end database(s) 110. Additionally, front-end database(s) 110 and back-end database 120 may be of the same or different types. For example, in some embodiments, front-end database(s) 110 may be a row-oriented database, while back-end database 120 may be a column-oriented database. In at least some embodiments, front-end database(s) 110 may be smaller and/or accessed with less frequency than back-end database 120.

Distributed database system 100 may also be configured to interact with various other clients, systems, and/or devices, such as by implementing a front end service module 102. Front-end service 102 may be configured to receive, process, and/or evaluate various different client requests 106, from one or more clients, such as clients 250 described in further detail below with regard to FIG. 2. Front end service 102 may also implement transaction manager 104 which may track and/or maintain the status of updates for front-end database(s) 110 and back-end database 120 that are involved with client requests 106. For instance, a client request 106 may be received and may involve one or more updates to be performed among the multiple databases of distributed database system 100. Transaction manager 104 may track the receipt of the client request and indicate the consistent state of the one or more updates to be applied as part of the client request 106. Client request 106 may generally be any request to perform a task/operation, calculate, manage, store, and/or retrieve data maintained at distributed database system 100. Client request 106 may be serviced by various components of distributed database system 100.

As noted above, in various embodiments, client request 106 may be received. Client request 106 may involve one or more updates to front-end database(s) 110 and to back-end database 120. For example, in some embodiments, front-end database(s) 110 may maintain metadata describing a database schema for back-end database 120 and/or access statistics for back-end database 120. If, for instance, client request 106 involves a request to add a new column to back-end database 120, then metadata maintained in front-end database(s) 110, may need to be updated. Thus, the one or more updates applied to front-end database(s) 110 may be changes to the metadata related to, in accordance with, or as a result of, updates that are to be applied to back-end database 120.

In some embodiments, front-end database(s) 110 may implement a front-end data store. Front-end data store may be any type of persistent storage device configured to persist data for front-end database(s) 110. Changes, updates, modifications, etc., to front-end database(s) 110 may be persisted in the front end data store. Consider again the example, where front-end database(s) 110 maintains metadata describing a database schema for back-end database 120. If the update applied at front-end database 110 is a change to the data type for a column in a database table schema maintained by front-end database(s) 110, then the persistent storage device may be configured to receive and store the updates to the metadata. A front-end data store may be generally be used for any operations performed by or implemented using front-end database(s) 110. For instance, in FIGS. 2-4 described below in further detail, front-end database(s) 110 may be used as part of a node that processes queries received for data maintained at a back-end database 120.

As discussed above, front-end database(s) 110 may apply front-end updates 112 to the database. In various embodiments, front-end database(s) 110 may then generate update logs 114 indicating the updates applied to front-end database(s) 110. For example, front-end database 110 may generate one or more redo logs that describe an update to front-end database 110 that may be replayed as part of the update log to perform the update. Update logs 114 may be one or more of various types of logs, such as redo logs, undo logs, or other log records. Update logs 114 may be obtained/received from front end-database(s) 110 at front end service 102. Front-end database(s) 110 may in some embodiments also send a snapshot of front-end database(s) 110 to be persisted (e.g., to be persisted at back-end database 120, or some other persistent storage system).

In various embodiments, front end service 102 may be configured to send back-end updates 122 to be performed at back-end database 120. Similar to updates applied at front-end database(s) 110, back-end updates 122 may be performed at back-end database 120 to update, add, remove, or modify data maintained by back-end database 120. Front-end service 102 may also be configured to send update logs 114 which may indicate the updates performed at front-end database(s) 110 to be persisted at back-end database system 120. These update logs 114 may be persisted as part of a data object for front-end database(s) 110, such as a particular row or column.

Back-end updates 122 to back-end database 120 and update logs 114 sent to be persisted at back-end database 120 may be considered a single transaction 126. Transaction 126 may be tracked, such as by transaction manager 104, or some other component of distributed database system, and be considered to either be committed or not committed together, as part of a single phase commit. Thus, for example, if back-end updates 122 have been applied to back-end database 120, but update log(s) 114 have not been persisted, then transaction 126 is not considered to be committed. In various embodiments, a single phase commit may only require that the back-end updates 122 and the update log(s) 114 be persisted at back-end database 120 in order to be committed, without additional phases or maintenance of overhead concerning transaction status at front-end database(s) 110.

Transaction manager 104 may determine whether transaction 126 committed in various ways. For example, in some embodiments, transaction manager 104 may query one or more nodes implementing back-end database 120 in order to determine that transaction 126 committed, such as by receiving a commitment acknowledgment from a consensus of storage nodes. Alternatively, back-end database 120 may be configured to determine and send a commit acknowledgement to transaction manager 104 upon commitment of transaction 126.

FIG. 1 describes a distributed database system that may implement single phase transaction commits, according to some embodiments. A distributed database system may, in some embodiments, implement a network-based service that makes it quick, easy, and cost-effective for clients (e.g., subscribers) to set up, operate, and scale a data warehouse in a cloud computing environment. The network-based service may manage time-consuming administration tasks, allowing subscribers to focus on their own applications and businesses. In some embodiments, the data warehouse system may be an enterprise-class database query and management system that is highly scalable and extensible. It may provide fast querying capabilities over structured data, may provide integration with various data loading and ETL (extract, transform, and load) tools, may provide client connections with best-in-class business intelligence (BI) reporting, data mining, and analytics tools, and may be optimized for very fast execution of complex analytic queries such as those including multi-table joins, sub-queries, and aggregation. In some embodiments, queries may be distributed and parallelized across multiple physical resources, and the data warehouse system may be scaled up or down on an as needed basis. In some embodiments, subscribers may only pay for the resources they use. The data warehouse system may work effectively with database schemas of various types and/or organizations, in different embodiments.

In some embodiments, the distributed data warehouse systems described herein may derive much of their performance and fast computing power from the use of massively-parallel processing (MPP) and the clustering of compute nodes that carry out the execution of compiled queries using a divide-and-conquer strategy. In some embodiments, a cluster may include one or more nodes, each including one or more disks, solid state devices, or other persistent storage devices on which data blocks are stored on behalf of clients. In some embodiments, clients/subscribers may submit queries in a number of ways, e.g., interactively via an SQL interface to the data warehouse system. In other embodiments, external applications and programs may submit queries using Open Database Connectivity (ODBC) and/or Java Database Connectivity (JDBC) driver interfaces to the data warehouse system.

In typical large database systems, the time it takes to restore data from a backup may represent a significant cost to the system. For example, in many existing systems, the entire data set needs to be restored before the database system can be restarted following a failure in the system. In some embodiments, the data warehouse systems described herein may be configured to back up data (e.g., the data making up various database tables) to a remote key-value storage system incrementally (e.g., one physical data block at a time), and to store, as part of each incremental backup operation, a list of the all of the data blocks in the system, whether they were backed up as part of that incremental backup or as part of a previous incremental backup operation. In some embodiments, the remote key-value storage system may be dedicated for backup storage, while in other embodiments the remote key-value storage system may provide general-purpose storage for a variety of clients and/or client applications. In various embodiments, a data warehouse system, a general-purpose computing system, or a computing system that provides another type of service that stores data locally in-memory (e.g., ephemerally) may write one or more copies of the data to a remote key-value storage system that employs disk, solid-state storage devices, or another type of persistent storage media in order to provide durability. As described in more detail below, the data warehouse systems described herein may be able to restart a cluster that stores data on behalf of a storage system subscriber (e.g., in a database) following a failure (i.e., allowing it to accept and service queries) without waiting for the entire data set to be restored from backup. Instead, a backup copy of any lost or corrupted data block may be streamed into the memory of the data warehouse system from the backup system by directly addressing it in the remote system using a unique identifier of the data block as a key.

Note that in the descriptions herein, the terms "data block" and "physical data block" may be used to refer to a portion (or block) of data that is stored as an individual (or separable) object in a distributed data warehouse system and/or in a remote key-value durable backup storage system on behalf of clients (e.g., users, client applications, and/or data warehouse service subscribers), or may be used to refer to that portion (or block) of the data as it is stored on a physical disk in a distributed data warehouse system, in system memory on a node in a distributed warehouse system (e.g., in systems that implement in-memory databases) and/or in a remote key-value durable backup storage system, depending on the context in which these terms appear. In some embodiments, data may be stored in data blocks having the same size as a standard unit of the data stored in the memory architecture for the system, which may correspond to a "page" in the memory. In other embodiments, the data blocks may be of a different size than the page size of the memory.

In some embodiments, the distributed data warehouse systems described herein may store two or more copies of each data block locally in the system (e.g., across a cluster architecture). For example, in one embodiment, a primary copy of each 1 MB physical data block may be stored on one disk of a node in a cluster, and one or more secondary copies (replicas) of that physical data block may be stored on other disks of other nodes in the same cluster. However, rather than replicating (or mirroring) an entire disk on one other disk, the copies of some of the data blocks stored on a given disk may be distributed on different disks than the copies of other data blocks stored on the given disk. The distributed data warehouse system may also store a copy of each data block as a separate object (i.e., value) in a remote backup storage system that provides durable key-value storage, and may store the keys for each data block within a list of data blocks in the system. For example, a superblock data structure that lists all of the data blocks stored in the data warehouse system (or in a node thereof) may include multiple entries, each of which stores metadata about an individual data block, and the metadata for each block may include a unique identifier (ID) that serves as a key to access a copy of the data block stored in the remote backup storage system. In some embodiments, the distributed data warehouse system may provide very high durability storage to its clients/subscribers by storing two copies of each data block in a given cluster (e.g., a primary copy and a secondary copy) and storing a third copy in a remote key-value durable storage system.

In some embodiments, the distributed data warehouse systems described herein may employ columnar (i.e., column-oriented) storage for database tables. In other words, column information from database tables may be stored into data blocks on disk, rather than storing entire rows of columns in each data block (as in traditional database schemes). In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. For a given number of disk requests, the column field values for many more rows may be retrieved than would be retrieved if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory.

In various embodiments, the distributed data warehouse systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, each cluster of the distributed data warehouse systems described herein may include a leader node and multiple computing nodes (i.e. non-leader nodes, such as query engines), each of which is virtual machine having some amount of storage (e.g., multiple disks) and/or processing power. In some embodiments, once it is configured, a cluster may be directly visible by (and accessible to) a client/subscriber through a network address. In other words, a client/subscriber may connect directly to a cluster (e.g., to submit queries and receive responses to those queries) and may not have to go through a web server (or service) to access the cluster except to set up and manage the configuration of the cluster. In some embodiments, the leader node in each cluster (which may not store client/subscriber data) may maintain query plans (e.g., including schema information and/or metadata) for performing various types of queries on the data stored by the computing nodes in the cluster. Within the leader node, a scheduler process may send query tasks (e.g., via a private network communication fabric) to the compute nodes for execution. In some embodiments, the leader node may also be responsible for partitioning incoming data (i.e., data included in write requests) for storage on various nodes of the cluster. For example, the leader node may determine the nodes on which primary copies of different portions of the received data will be stored.

In some embodiments, when a client request to perform a query (e.g., a read request or a write request) or some other type of database operation is received (e.g., by the leader node in a cluster), the distributed data warehouse system may spawn a new process to maintain session information for the client, and that process may be maintained as long as the client session remains open and that client is sending query requests to the leader node. The requested operation (a SQL query or some other database operation) may be routed through a parser and optimizer to develop a query execution plan to perform or execute the specified query or database operation (i.e., the logical steps needed to perform the query). The query plan may then be routed to the execution engine, which generates and compiles query execution code that the leader node and the non-leader nodes (sometimes referred to herein as the compute nodes) will execute to complete the query. In some embodiments, each of the individual execution plan steps may be involve a simple operation or manipulation of data, to be performed by the compute nodes or the leader node, and the communication network connecting the leader node and compute nodes may be used to distribute intermediate results. In some embodiments, the distributed data warehouse system may achieve excellent query execution performance by separating query processes in each of multiple node slices in order to execute the compiled query code in parallel. In addition, the distributed data warehouse system may take advantage of optimized network communication, memory and disk management to pass intermediate results from one query plan step to the next, which may also help to speed query execution. In some embodiments, the last segment of a query may return the requested data. If the return set is to be aggregated or sorted, the compute nodes may each send a respective portion of the intermediate result to the leader node, which may then merge the returned data so that the final result of the query can be sent back to the requesting client/subscriber.

FIG. 2 is a block diagram illustrating various components of a distributed data warehouse service from the perspective of its clients, according to some embodiments. Multiple users or clients may access a distributed data warehouse cluster to obtain data warehouse services. Clients which may include users, client applications, and/or data warehouse service subscribers), according to some embodiments. In this example, each of the clients 250*a* through 250*n* is able to access distributed data warehouse cluster 225 and 235 respectively in the distributed data warehouse service 280. Distributed data warehouse cluster 225 and 235 may include two or more nodes on which data may be stored on behalf of the clients 250*a* through 250*n* who have access to those clusters.

A client, such as clients 250*a* through 250*n*, may communicate with a data warehouse cluster 225 or 235 via a desktop computer, laptop computer, tablet computer, personal digital assistant, mobile device, server, or any other computing system or other device, such as computer system 1000 described below with regard to FIG. 7, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250*a* through 250*n* may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250*a* may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250*a* to 250*n* of the clusters which allow the clients 250*a* through 250*n* to send requests and other messages directly to a particular cluster. As noted above, network endpoints, for example may be a particular network address, such as a URL, which points to a particular cluster. For example, client 250*a* may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 7. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4B. Clusters may be configured to receive requests and other communications over WAN 260 from clients, such as clients 250*a* through 250*n*. A cluster may be configured to receive requests from multiple clients via the network endpoint of the cluster.

In some embodiments, distributed data warehouse service 280 may be implemented as part of a web service that allows users to set up, operate, and scale a data warehouse in a cloud computing environment. The data warehouse clusters hosted by the web service may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 7. Different subsets of these computing devices may be controlled by distributed data warehouse service manager 202. Distributed data warehouse service manager 202, for example, may provide a cluster control interface to clients, such as clients 250*a* through 250*n*, or any other clients or users who wish to interact with the data warehouse clusters managed by the distributed data warehouse manager 202, which in this example illustration would be distributed data warehouse clusters 225 and 235. For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as clients 250*a* through 250*n* discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes, may for example, be implemented on servers or other computing devices, such as those described below with regard to computer system 1000 in FIG. 7, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system.

Figure 5:
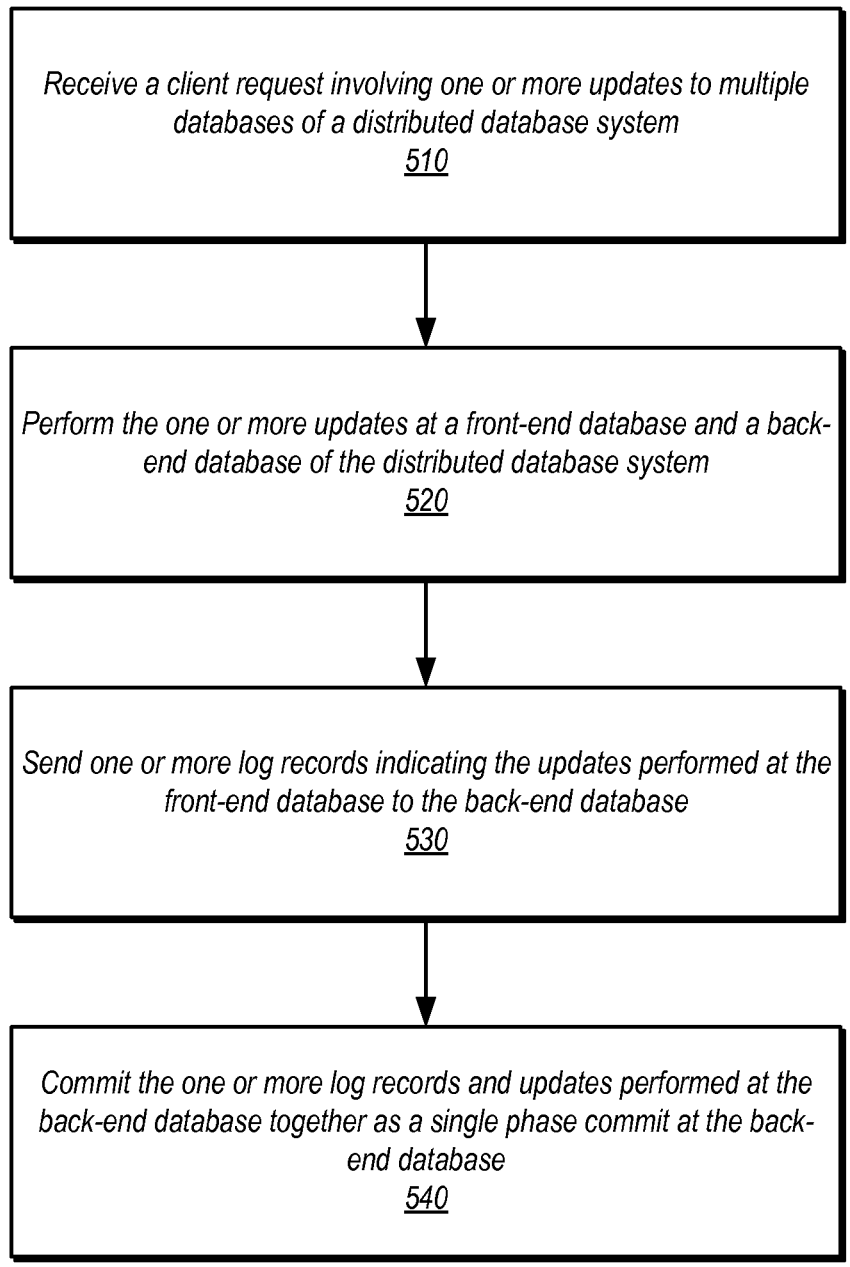
FIG. 5 is a high-level flowchart illustrating a method for implementing single phase transaction commits for distributed database transactions, according to some embodiments.
Figure 6:
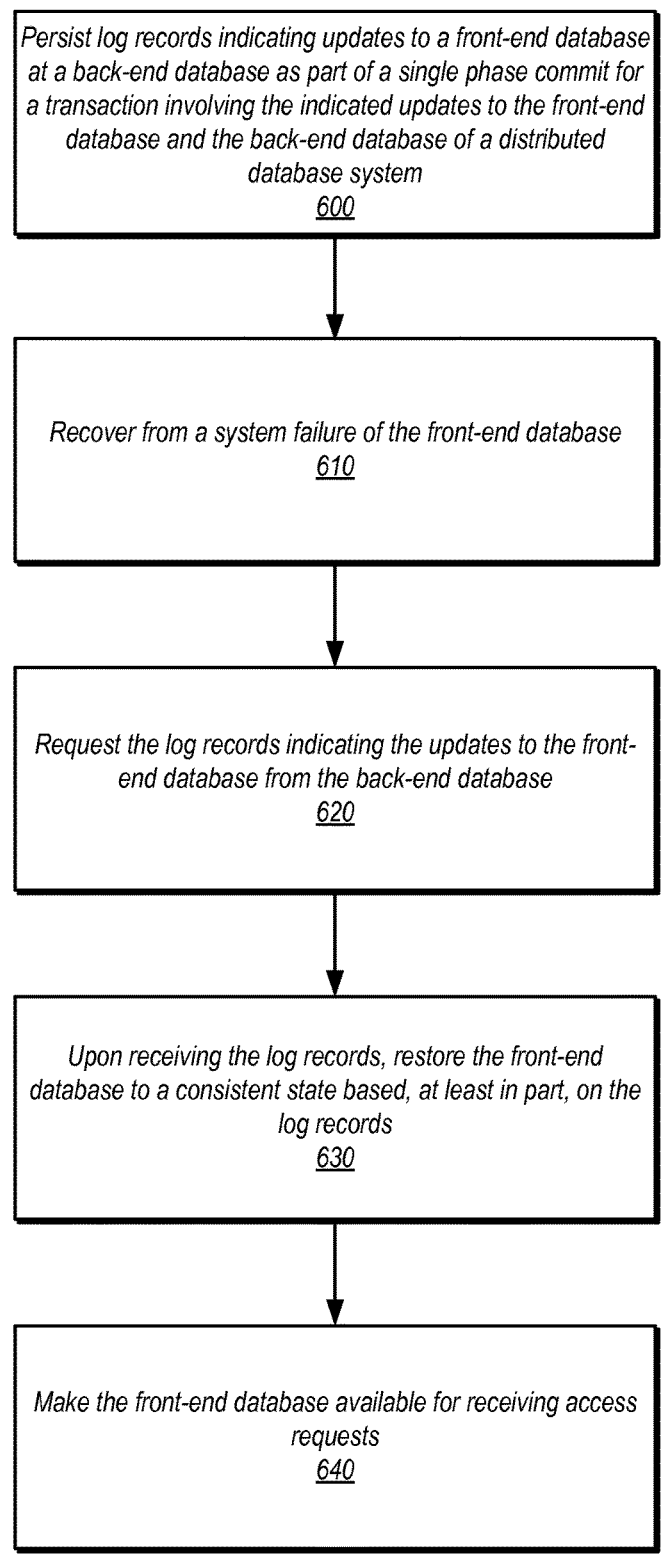
FIG. 6 is a high-level flowchart illustrating a method for recovering from a system failure of a database in a distributed system implementing single phase transaction commits, according to some embodiments.

In various embodiments, a distributed data warehouse service, such as illustrated above in FIGS. 2-3, may implement various embodiments and techniques for single phase transaction commit for distributed database systems, such as those discussed in further detail below with regard to FIGS. 5 and 6. FIG. 4 is a block diagram illustrating single phase transaction commits among nodes implementing a distributed data warehouse system, according to some embodiments.

As state above with regard to FIGS. 2 and 3, leader node 320 may interact with and respond to various client requests. As part of responding to various client requests 402, in some embodiments leader node 320 may implement a query engine 418. Query engine 418 may be implemented as hardware, software, or some combination of hardware and software that is configured to generate and send one or more query plans that are executable by compute nodes 310 (sometimes referred to as storage nodes) to respond to queries for data maintained as part of back-end database 422 for a client. As part of generating query plans, query engine 418 may obtain information from front-end database 412. For example, in some embodiments, front-end database 412 may maintain a database schema mapping client names and/or identifiers to back-end database identifiers for data.

For example, query engine 418 may access front-end database 412 to map a query for column "Sales" to back-end database 422 column id 24. Query engine 418 may also access front-end database 412 to obtain access statistics for back-end database 422 to optimize query plans. For example, query engine 418 may distribute work in a query plan according to the expected load for each compute node 310 as determined by access statistics in front-end database 412. In some embodiments, query engine 418 may also access transaction manager 418 to determine the consistent state of front-end database 412.

Leader node 320 may also implement front-end database 412. In at least some embodiments, front-end database 412 may be a row-oriented database. Front-end database may maintain metadata and other information describing back-end database 422. For instance, metadata may include a database schema that may provide mapping information, as well as type, structure, arrangement, modification, storage preferences, etc. of the back-end database 422. Mapping information, for instance, may translate client terminology for different portions of the database, such as "Name" column, "Date" column, or "Product" column, to ID or index values used in the back-end database system, such as column 0010 for "Name", column 0012 for "Date", or column 0030 for "Product." Type information, such as the data types for a particular row or column are string, integer, char, etc., may be maintained. Various other structural, format, or modification information may also be maintained, such as column 1 has a run-length encoding applied, whereas column 3 has a dictionary-based encoding applied. Descriptive information may also include statistical or other data related to access of a particular table or other object(s) of the back-end database, such as, the number of times queries are directed toward a particular row, column, search term, or data block as well as the time of data, the amount of data retrieved, or the frequency with which data is accessed.

Leader node 320 may also implement update engine 414. Update engine 414 may be implemented by hardware, software, or some combination thereof to direct the performance of updates in a consistent manner across the front-end database 412 and back-end database 424. Update engine 414 may receive a client request 402 that triggers updates to front-end database 412 and back-end database 422. For example, client request 402 may request an additional column be added to back-end database 422. Update engine 414 may provide access front-end database 412 to update the metadata maintained in front-end database 412 to include information describing the ne column. Update transaction engine 414 may receive back from the front-end database 412, update logs describing the changes applied to the front-end database. Thus, in the present example, the log records that indicate the changes to add information describing the new column. Update engine 414 may also, in some embodiments, register the client request 402 as a transaction at transaction manager 416.

In various embodiments, update engine 414 may send the back-end updates 434 to be performed at back-end database 422. In various embodiments, back-end database 422 is a columnar or column-oriented database. Continuing with the example above, the updates include adding an additional column to the database, such as by adding a new back-end data object 426. Update engine 414 may also send front-end update log 432 to back-end database 422. In some embodiments, front-end update log 432 may be persisted as its own front-end data object 424. For example, log records for a front end database may, in some embodiments, be stored in a single column of back-end database 422. Front-end update log 432 and back-end updates 434 may be together considered a single transaction 430, and committed according to a single phase commit. Thus, as described above with regard to FIG. 1, transaction 430 may not be considered committed until both front-end update log 432 and back-end updates 434 have been persisted at back-end database 422. As back-end updates 434 and front-end update log 432 are persisted in back-end database 422, superblock 470 may be updated to reflect the newly persisted data.

Leader node 320 may also implement a transaction manager 416 in order to track the status of transactions for the data warehouse cluster. In various embodiments, transaction manager 416 may be configured to determine whether a transaction is committed by querying transaction state 444 from the compute nodes 310. In at least some embodiments, compute nodes 310 may implement one or more superblocks 470, such as described above with regard to FIGS. 2 and 3, may describe the location of data stored on the compute nodes 310. In at least some embodiments, superblocks 470 may indicate whether transaction 430 is committed. For example, in some embodiments a versioning recovery method may be implemented where commits are performed by writing a new version of superblock 470 for a compute node. A consistent version of the superblock 470 may be maintained while a new version is written. The consistent version of the superblock 470 may then be switched to the new version when writing is complete. In order to respond to query for the transaction state of transaction 430, computes nodes 310 may determine which version of the superblock 470 is the consistent version for compute nodes 310. If the consistent version of superblock 410 indicates that transaction 430 is persisted, and therefore committed, compute nodes 310 may send a transaction committed 446 acknowledgment to transaction manager 416. Alternatively, compute nodes 310 may send transaction committed 446 acknowledgment to transaction manager 416 automatically upon determining that transaction 430 is committed. In some embodiments, transaction manger 416 may send a request acknowledgment 404 to the client who submitted request 402.

In the event that front-end database 412 fails, leader node 320 may be configured to restore front-end database 412, according to the various techniques discussed in detail below with regard to FIG. 6. The log records maintained in front-end data object 424 may be requested, along with a snapshot that may be maintained in back-end database system, or in some other persistent storage. The log records may then be applied to restore front-end database 412, and make front-end database 412 available for access, such as access by query engine 418 or update engine 414.

As noted above, in typical distribute database systems, transactions that involve updates to multiple databases employ multiple states or phases to ensure consistency of a transaction across the multiple databases. For instance, a two-phase commit protocol is commonly implemented in these types of scenarios. A query to commit message from a transaction manager is sent to the database systems involved in the transaction. The database systems then perform the requested updates until reaching the commit point. The database systems may then return the agreement to commit message to the transaction manager. Upon determining that all of the database systems agree to commit, then the transaction manager sends a commit message to the database systems. The database systems either commit and acknowledge the commitment or respond with an abort (or failure to respond). The transaction manager either commits the transaction upon receiving an acknowledgement from all of the database systems, or sends a roll-back instruction if one or more fail to commit.

Implementing multiple-phase or states to commit transactions requires increased overhead. In many typical implementations, the state of the protocol at each database system must be maintained, in addition the extra communication requirements between transaction managers and database systems. Additionally, various failure scenarios, such as the failure of the transaction manager, may lockout or stall the performance of database systems, and even require manual intervention from a distributed database system operator to complete or roll-back transactions. Multiple-phase commit protocols such as two-phase commit burden individual databases or nodes with the concern that in-flight transactions sent to other nodes may have not committed.

Many different types of distributed database systems may implement single phase transaction commits for distribute database system transactions. FIG. 4, illustrated above, provides an example of a distribute data warehouse service that implements single phase transaction commits for updates to a front-end database and a back-end database. While FIG. 1, provides an illustration of multiple databases, front-end database(s) 110, involved in distributed database system transactions implementing single phase transaction commits. The descriptions provided above with regard to FIGS. 1 through 4, are merely some examples of distributed systems implementing single phase transaction commits, and are not intended to be limiting. FIG. 5 provides a high-level flowchart illustrating various methods and techniques for implementing single phase transaction commits for distributed database transactions, according to various embodiments.

As indicated at 510, a client request may be received involving one or more updates to multiple databases of a distributed database system, in at least some embodiments. A client request may be one of many different types of requests directed to a distributed database storage system. For example, one of the many different types of client requests discussed above with regard to FIGS. 2-4, such as a request to modify a database table maintained for a client. Client requests may be formatted according to one of the various different APIs or other communication protocols or technologies discussed above. In some embodiments, the client request may be evaluated to identify or determine one or more transactions to be performed at the distributed database system. These transactions may consist of various updates to be applied to the multiple databases.

In some embodiments, a front-end database may be related to or descriptive of a back-end database. One database may, for instance the front-end database may describe suppliers and the respective product ids supplied, while the back-end database may describe the particular products themselves. In various embodiments, the front-end database may maintain metadata or other descriptive information. For example, in at least some embodiments, a front-end database may maintain a database schema of back-end database. A database schema may provide mapping information, as well as they type, structure, arrangement, modification, storage preferences, etc. of the back-end database. Mapping information, for instance, may translate client terminology for different portions of the database, such as "Name" column, "Date" column, or "Product" column, to ID or index values used in the back-end database system, such as column 0010 for "Name", column 0012 for "Date", or column 0030 for "Product." Type information, such as the data types for a particular row or column are string, integer, char, etc., may be maintained. Various other structural, format, or modification information may also be maintained, such as column 1 has a run-length encoding applied, whereas column 3 has a dictionary-based encoding applied. Descriptive information may also include statistical or data related to access of the back-end database, such as, the number of times queries are directed toward a particular row, column, search term, or data block as well as the time of data, the amount of data retrieved, or the frequency with which data is accessed. As many other different examples of descriptive data may be envisioned, the previous examples are not intended to be limiting.

In at least some embodiments, the one or more updates may be performed at a front-end database and a back-end database of the distributed database system, as indicated at 520. Updates may be one or more various changes to the front-end and back-end databases, such as adding, removing, modifying, or re-writing data. As applying updates to databases is well-known to those of ordinary skill in the art, the following examples are not intended to be limiting. For example, in at least some embodiments, updates may involve an insert/delete or add/remove of a row/column at a database table. Thus, new data values are added, where appropriate, or removed, where appropriate, as part of applying the updates to the particular entries, rows, or columns of the database. In some embodiments, the updates to the back-end database and the front-end database may involve different operations. If for instance, the front-end database maintains metadata describing the back-end database, and a change compression type request is received from a client for a column of a back-end database, then a new or modified value may be written to an entry in the front-end database describing the compression type of the column, while the back-end database may read the column, decompress the data, recompress the data according to the new compression type, and write the newly compressed data to the column. In various embodiments, the different ways updates are applied to a database may be dependent on the database's type. For example, in some embodiments, a front-end database may implement write-ahead logging to maintain data, while a back-end database may implement a versioning method to maintain data at the back-end database.

The multiple databases of the distributed database system, including the front-end database and the back-end database, may be of the same or different type. For example, in some embodiments, the front-end database may be a row-oriented database, while the back-end database may be a column-oriented database. However, in other embodiments, the front-end database may be column-oriented, while the back-end database may be row-oriented. Alternatively, the front-end database and the back-end database may be of the same database type, such as row oriented or column oriented. Similar diversity may be found when greater than two database systems are implemented, such as front-end databases that include row and column-oriented database types along with a back-end database that is a row or column-oriented database type. As database type or schema may be implemented in a variety of different ways, the previous examples are not intended to be limiting.

In some embodiments, one or more log records indicating the updates performed at the front-end database may be sent to the back-end database, as indicated at 530. Log records, as described above with regard to FIGS. 1 and 4, may generally be any type of record, entry, or data associated with a log. A log may be any record of actions taken with respect to a database. In various embodiments, log records may indicate the sequence and/or timing of these actions taken with respect to the database. In at least some embodiments, log records may be of many different types, such as redo log records, undo log records, or log records associated with a transaction table. The one or more log records sent to the back-end database may a group of different types of log records, such as redo and undo log records sufficient to apply or remove the update to the front-end database. In at least some embodiments, log records may be dependent a snapshot of the front-end database or some other data or record that provides a previous state of the front-end database. Once received log records may be persisted as part of the back-end database. In some embodiments, such as illustrated in FIG. 4, log records for the front-end database may be stored along with other log records in a same data object, structure, row, column, etc., such as may be defined or allocated for storing log records for the front-end database. In at least some embodiments, log records may be concatenated together as a single column in the back-end database.

A snapshot of the front-end database may be sent to be persistently stored, in at least some embodiments. A snapshot may be a record of the consistent state of some or all of the values maintained for a database. The snapshot may be stored, in some embodiments, in the back-end database. Alternatively, the snapshot may be persistently stored in some other storage service, or accessible storage device. In various embodiments, a snapshot may be sent to be persistently stored in response to detecting a snapshot event. A snapshot event may be a timer or some other mechanism that periodically triggers the sending of a new snapshot of the front-end database to be persisted. A snapshot event may also be a limit or threshold applied to the log recording updates to the front-end database, such that when the threshold or limit of the number and/or size of log records is exceeded, a snapshot event may be detected, and a new snapshot of the front-end database may be sent to be persistently stored.

As indicated at 540, the one or more log records and the one or more updates performed at the back-end database may be committed together as a single phase commit at the back-end database, in various embodiments. As opposed to the multiple-phase commits, discussed above a single phase commit may direct the back-end database to persistently store the one or more log records and persistently apply the one or more updates to the back-end database as single transaction. Thus, the one or more log records, as noted above, may be received and persistently stored as part of the back-end database. Similarly, updates associated with the client request for the back-end database may also be applied, and persistently stored at the back-end database. Upon persistently storing and applying the one or more log records to the back-end database, the single transaction that includes the log records and the updates may be deemed committed. In this way, updates made to the front-end database and updates made to the back-end database may be made consistent across the front-end database and the back-end database without maintaining overhead to track the status of transactions/updates to be applied to both databases.

In some embodiments, an acknowledgment of the commitment may be received at a transaction manager or some other module, node, or device that requested the log records and the updates to the back-end database be committed. FIG. 4, described above, provides further examples of various techniques to determine whether updates and log records have been committed at a back-end database system.

As discussed above, typical distributed database systems may implement a multiple-phase commit process or protocol to maintain consistent transactions across multiple databases. Often times, in the event of a system or other failure, the status of transactions at other database systems must be determined in order to restore a consistent state of a particular database system that has failed. FIG. 6 is a high-level flowchart illustrating a method for recovering from a system failure of a database in a distributed system implementing single phase transaction commits, according to some embodiments.

As indicated at 600, log records indicating changes to a front-end database may be persisted at a back-end database as part of a single phase commit for a transaction involving the indicated updates to the front-end database and the back-end database of a distributed. A system or some other kind of failure may occur, causing the front-end database to fail. For example, a virtual instance implementing the front-end database may stall or crash. Alternatively, a physical computing device, such as computing system 1000 described below regard to FIG. 7, may lose power or restarting, causing the front-end database system to fail. In various embodiments, upon recovery from a system failure of the front-end database, as indicated at 610, the log records indicating updates to the front end database may be requested from the back-end database, as indicated at 620. Log records persisted at the back-end database may, as noted above with regard to FIG. 5, be stored in a single data object, in some embodiments. Log records may also comprise one of more different types of log records, such as redo log records, undo log records, etc. . . . The requested log records may include any and/or all log records persisted at the back-end database that may be sufficient to reconstruct the consistent state of the front-end database. In some embodiments, a snapshot of the front-end database may also be obtained. The snapshot may be requested from the back-end database or some other service, system, node, or device persistently storing the snapshot of the front-end database. The snapshot may be, in some embodiments, the snapshot on which the log records are dependent.

As indicated at 630, upon receiving the requested log records, the front-end database may be restored based, at least in part, on the requested log records, according to various embodiments. Log records may be used to generate the consistent state of the front-end database alone or combination with other data, such as a snapshot. For example, in some embodiments, the entire log of changes/ updates made to a front end database, such as the initial creation, population, and subsequent modification of the front-end database, may be persisted in the back-end database. To restore the front-end database, the entire log may simply be replayed or applied. Alternatively, in some embodiments, log records persisted in the back-end database may be dependent on a snapshot or some other data in order to restore the consistent state of the log. For instance, the log records may describe updates to data stored in the front-end database in a relative fashion, such as referencing a prior data value of a block, (e.g., block value+12). As many different techniques for applying logs to restore databases are well-known to those of ordinary skill in the art, the previous examples are not intended to be limiting as to various other methods or techniques.

In at least some embodiments, as indicated at 640, upon restoration, the front-end database system may be made available for receiving and/or servicing access requests. FIG. 4, discussed above, provides some examples of various ways and purposes for which a front-end database may service access requests as part of a distributed database system.

Figure 7:
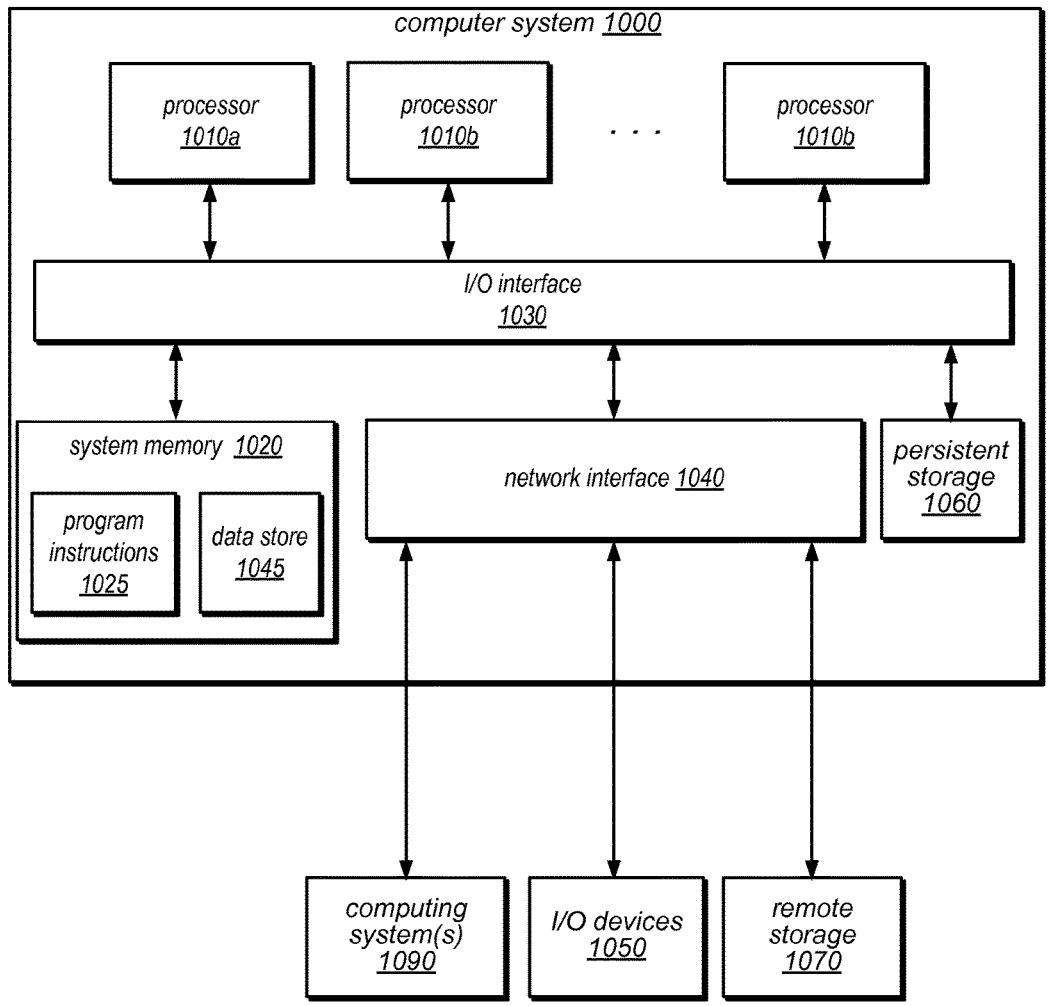
FIG. 7 is a block diagram illustrating a general computing system, according to various embodiments.

FIG. 7 is a block diagram illustrating a general computer system, according to various embodiments. For example, computer system 1000 may be configured to implement a leader node of a cluster in a distributed data warehouse system, a compute node or storage node of a cluster in a distributed data warehouse system, a distributed data warehouse front-end service module, or any other component of a distributed database system. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement a distributed system. In another example, an instance of a server application executing on computer system 1000 may use network interface 1040 to communicate with other instances of the server application that may be implemented on other computer systems.

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed.

Computer system 1000 includes one or more system memories 1020 that are configured to store instructions and data accessible by processor 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a leader node of a cluster in a distributed data warehouse system, a compute node or storage node of a cluster in a distributed data warehouse system, a distributed data warehouse front-end service module, or any other component of a distributed database system. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 130. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the data warehouse system (e.g., on a leader node or a compute node), such as a superblock data structure, one or more data block access counters, a query history, an transaction log, or other information used in performing the methods described herein may be stored in data store 1045 or in another portion of system memory 1020 on one or more nodes, in persistent storage 1060, and/or on one or more remote storage devices 1070, in various embodiments. In some embodiments, and at various times, system memory 1020 (e.g., data store 1045 within system memory 1020), persistent storage 1060, and/or remote storage 1070 may store primary copies of data blocks, secondary copies (i.e., replicas) of data blocks, backup copies of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1510). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more server nodes and/or clients of the distributed data warehouse system and/or a distributed database system), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
  a plurality of nodes configured to implement a distributed data warehouse service, comprising:
    a front-end database;
    a back-end database;
    a front-end service module, configured to:
      receive a client request involving one or more updates to the front-end database and the back-end database;
      direct the performance of the one or more updates consistently across the front-end database and the back-end database, comprising:
        send the one or more updates to the front-end database and the back-end database to be performed;
        receive one or more log records indicating updates performed at the front-end database from the front-end database;
        send the one or more log records indicating updates performed at the front-end database to the back-end database; and
        send a commit request to perform a commit of the one or more log records sent to the back-end database from the front-end service module and the updates performed at the back-end database together as a single phase commit at the back-end database.

2. The system of claim 1, wherein the front-end service module is further configured to:
upon recovery from a system failure of the front-end database:
request log records sufficient to reconstruct a consistent state of the front-end database from the back-end database, wherein the requested log records include the one or more log records;
upon receiving the requested log records, restore the front-end database to the consistent state of the front-end database based, at least in part, on the requested log records; and
make the front-end database available for servicing access requests.

3. The system of claim 2,
wherein the one or more records indicating the updates to the front-end database are dependent on a snapshot of the front-end database persisted in the back-end database;
wherein the front-end service module is further configured to obtain the snapshot of the front-end database from the back-end database;
wherein, to restore the front-end database to the consistent state of the front-end database, the front-end service module is further configured to apply the requested log records to the snapshot of the front-end database.

4. The system of claim 1, wherein the plurality of nodes together implement a data warehouse cluster for the distributed data warehouse service, wherein one of the plurality of nodes is a leader node that implements the front-end database and the front-end service module, and wherein other nodes of the plurality of nodes are storage nodes that together implement the back-end database, wherein the front-end service module is further configured to query the storage nodes to determine that the one or more log records and the updates performed at the back-end database have committed.

5. The system of claim 1, wherein the front-end database is a row-oriented database implementing write-ahead logging to maintain metadata describing the back-end database and wherein the back-end database is a column-oriented database implementing versioning to maintain data for one or more clients of the distributed data warehouse service.

6. A method, comprising:
performing, by one or more computing devices:
receiving a client request involving one or more updates to multiple databases of a distributed database system;
performing the one or more updates at a front-end database and a back-end database of the distributed database system;
sending one or more log records indicating the one or more updates performed at the front-end database to the back-end database; and
committing the one or more log records sent to the back-end database and the one or more updates performed at the back-end database together as a single phase commit at the back-end database.

7. The method of claim 6, further comprising:
upon recovery from a system failure of the front-end database:
requesting log records sufficient to reconstruct a consistent state of the front-end database from the back-end database, wherein the requested log records include the one or more log records;
upon receiving the requested log records, restoring the front-end database to the consistent state of the front-end database based, at least in part, on the requested log records; and
making the front-end database available for servicing access requests.

8. The method of claim 7, wherein said restoring the front-end database to the consistent state of the front-end database is performed without determining the state of one or more transactions at the back-end database.

9. The method of claim 7,
wherein the method further comprises sending a snapshot of the front-end database to be persistently stored;
wherein the one or more log records indicating updates performed at the front-end database are dependent on the snapshot of the front-end database;
wherein the method further comprises upon the recovery from the system failure of the front-end database, obtaining the snapshot of the front-end database;
wherein said restoring the front-end database to the consistent state of the front-end database comprises applying the requested log records to the snapshot of the front-end database.

10. The method of claim 7, wherein said sending a snapshot of the front-end database to be persistently stored is performed in response to detecting a snapshot event.

11. The method of claim 6, wherein the distributed database system is a distributed data warehouse service, wherein the one or more computing devices together implement a leader node of a data warehouse cluster implemented as part of the distributed data warehouse service, wherein the leader node implements the front-end database, wherein the data warehouse cluster further comprises one or more storage nodes implementing the back-end database, and wherein the front-end database maintains metadata describing the back-end database.

12. The method of claim 11, wherein the metadata describing the back-end database comprises a database schema for the back-end database and query statistics for data stored as part of the back-end database.

13. The method of claim 11, further comprising querying, via the leader node, the one or more storage nodes to determine that the one or more log records and the one or more updates performed at the back-end database have committed.

14. A non-transitory, computer-readable storage medium, storing program instructions that when executed by one or more computing devices together implement a node of a plurality of nodes that together implement a distributed data warehouse service, wherein the distributed data warehouse service implements a front-end database and a back-end database, and wherein the program instructions cause the node to implement:
receiving a client request involving one or more updates to the front-end database and the back-end database;
performing the one or more updates at the front-end database and the back-end database;
sending one or more log records indicating the one or more updates performed at the front-end database to the back-end database; and
committing the one or more log records sent to the back-end database and the one or more updates performed at the back-end database together as a single phase commit at the back-end database.

15. The non-transitory, computer-readable storage medium of claim 14, wherein the one or more log records are dependent on a snapshot of the front-end database, and wherein the program instructions cause the node to further implement sending a snapshot of the front-end database to be persistently stored.

16. The non-transitory, computer-readable storage medium of claim 15, wherein the program instructions cause the node to further implement:
   upon recovery from a system failure of the front-end database:
      obtaining the snapshot of the front-end database;
      requesting log records sufficient to reconstruct a consistent state of the front-end database from the back-end database, wherein the requested log records include the one or more log records; and
      upon receiving the requested log records, applying the requested log records to the snapshot of the front-end database in order to reconstruct the consistent state of the front-end database.

17. The non-transitory, computer-readable storage medium of claim 16, wherein upon recovery from a system failure of the front-end database, the program instructions cause the node to further implement making the front-end database available for servicing access requests.

18. The non-transitory, computer-readable storage medium of claim 14, wherein the front-end database is a row-oriented database, and wherein the back-end database is a column-oriented database.

19. The non-transitory, computer-readable storage medium of claim 18, wherein the row-oriented database maintains a database schema describing the column-oriented database.

20. The non-transitory, computer-readable storage medium of claim 19, wherein the node implementing the row-oriented database is a leader node of a data warehouse cluster implemented as part of the distributed data warehouse service, wherein the one or more nodes implementing the column-oriented database are storage nodes of the data warehouse cluster, and wherein the program instructions cause the node to further implement:
   receiving from the one or more storage nodes an acknowledgment that the one or more log records and the one or more updates performed at the back-end database have committed.

\* \* \* \* \*